July 27, 1926. 1,594,244
L. G. DANIELS
CUTTING MECHANISM FOR HARVESTING MACHINES
Filed August 13, 1923
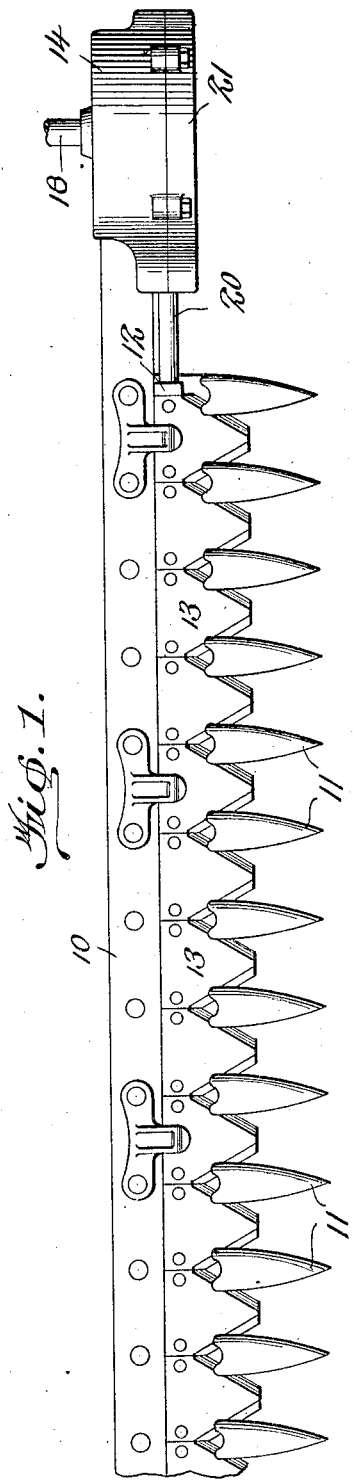
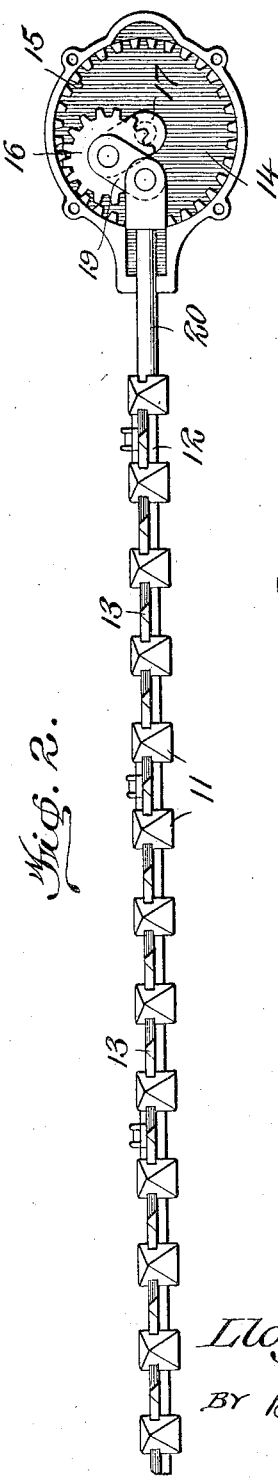
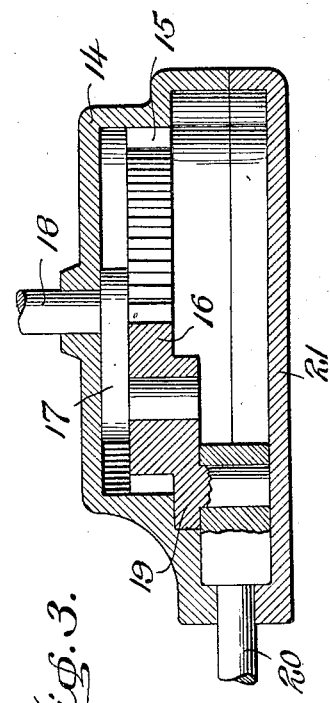
Inventor
Lloyd G. Daniels,
By Bright & Bailey
Attorneys Patented July 27, 1926.

1,594,244

UNITED STATES PATENT OFFICE.

LLOYD G. DANIELS, OF AKRON, COLORADO, ASSIGNOR, BY DIRECT AND MESNE ASSIGNMENTS, OF ONE-SIXTH TO H. C. P. MADDISON, OF AKRON, COLORADO; ONE-THIRD TO LLOYD PARRIOTT, OF BERTRAND, NEBRASKA; AND ONE-THIRD TO ED STRICKLER, OF HOLDREGE, NEBRASKA.

CUTTING MECHANISM FOR HARVESTING MACHINES.

Application filed August 13, 1923. Serial No. 657,125.

My invention relates to cutting mechanism for harvesting machines, and has particular reference to improvements in means for imparting reciprocating motion to harvester cutter bars.

The purposes of my invention are to provide a compact assemblage of the means mentioned; to eliminate cranks and pitmen such as are commonly employed in present commercial types of harvesters for operating the cutter bars thereof; to eliminate lateral strains on the cutter bars, such as occur through the use of cranks, pitmen, etc.; to provide for the thorough lubrication of said means, and to so construct and arrange said means that the same is cheap and easy to produce, strong, durable and thoroughly reliable and efficient in operation.

With the foregoing and other purposes in view, my invention consists in the novel features of construction, combination and arrangement of parts as will be hereinafter more fully described, illustrated in the accompanying drawings and defined in the appended claim.

In the drawings, wherein like characters of reference denote corresponding parts in the different views Figure 1 is a top plan view of a harvester cutting mechanism embodying my improved means for imparting reciprocating motion to the cutter bar thereof;

Figure 2, a front elevation of the cutting mechanism shown in Figure 1 with the cover removed from the housing of the operating mechanism to show the arrangement of the elements therein; and Figure 3, a horizontal section through the housing and the operating elements contained therein.

Referring now to the drawings in detail, it will be observed that my improved operating mechanism is shown associated with a cutter mechanism of a well known commercial type including a finger bar 10 carrying a plurality of spaced, slotted guard fingers 11 through which extends a reciprocable cutter bar 12 made up of a plurality of knife sections 13, said parts being without novelty and adapted to operate in the usual well known manner.

My improved mechanism for effecting reciprocation of the cutter bar 12 consists essentially of a housing 14 carrying an internal gear 15 with which meshes a pinion 16 rotatably mounted at the end of a crank 17 fixed to the end of a drive shaft 18 that enters the center of the housing. Pinion 16 has fixed thereto an arm 19 pivoted at its outer end to a rod 20 forming an extension of the cutter bar 12, and as shown, said pinion is one-half the diameter of internal gear 15 and crank 17 and arm 19 are of such length that when shaft 18 is rotated and pinion 16 caused to transverse gear 15 and also rotate, rod 20 is caused to reciprocate in a direct line across the housing 14 and thereby impart reciprocatory motion to the cutter bar.

The mechanism constituted by parts 14 to 20 inclusive operates on the principle of the hypocycloid curve and when adapted as disclosed herein to the reciprocation of cutter bars of harvesters possesses many obvious advantages, since as previously mentioned, it eliminates lateral strains on the cutter bar and permits a compact arrangement of operating parts which, when enclosed by the cover plate 21, may be caused to operate in a bath of oil and thereby be thoroughly and effectively lubricated at all times.

Housing 14 may be cast integrally with finger bar 10 or formed as an element separate therefrom and rigidly secured thereto in any preferred manner, and any suitable driving connection may be employed between shaft 18 and the wheels or other rotating part of the harvester with which the cuttting mechanism is associated.

From the foregoing description considered in connection with the accompanying drawings, it is believed that the construction, operation and advantages of my improvements will be thoroughly understood. It is desired to point out, however, that various changes and desirable additions may be made in and to the arrangement shown within the spirit and scope of my invention as defined in the appended claim.

I claim:—

In cutting mechanism for harvesters, the combination with a finger bar and a reciprocable cutter bar, of a housing carried by the finger bar, a rotatable drive shaft entering said housing, an extension on the cutter bar also entering said housing, and means entirely within said housing to cause rotary motion of said drive shaft to impart reciprocatory motion to said cutter bar.

In testimony whereof I hereunto affix my signature.

LLOYD G. DANIELS.